United States Patent
Dolgin et al.

(10) Patent No.: US 10,530,494 B2
(45) Date of Patent: Jan. 7, 2020

(54) SYSTEMS AND METHODS FOR DETECTION AND DEMODULATION OF OPTICAL COMMUNICATION SIGNALS

(71) Applicant: RAYTHEON COMPANY, Waltham, MA (US)

(72) Inventors: Benjamin P. Dolgin, Alexandria, VA (US); Gary M. Graceffo, Burke, VA (US); Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 80 days.

(21) Appl. No.: 15/433,326

(22) Filed: Feb. 15, 2017

(65) Prior Publication Data

US 2018/0091230 A1     Mar. 29, 2018

Related U.S. Application Data

(60) Provisional application No. 62/400,385, filed on Sep. 27, 2016.

(51) Int. Cl.
*H04B 10/67*       (2013.01)
*H04B 10/114*     (2013.01)

(52) U.S. Cl.
CPC ......... *H04B 10/671* (2013.01); *H04B 10/114* (2013.01)

(58) Field of Classification Search
CPC .... H04B 10/11; H04B 10/516; H04B 10/697; H04B 10/114; H04B 10/671
See application file for complete search history.

(56) References Cited

U.S. PATENT DOCUMENTS

| | | | |
|---|---|---|---|
| 5,371,623 | A | 12/1994 | Eastmond et al. |
| 5,684,793 | A | 11/1997 | Kiema et al. |

(Continued)

FOREIGN PATENT DOCUMENTS

| | | |
|---|---|---|
| JP | H0591047 A | 4/1993 |
| WO | 0195534 A2 | 12/2001 |
| WO | 2016170466 A1 | 10/2016 |

OTHER PUBLICATIONS

Arimoto et al., "High-speed free-space laser communication", Performance and Management of Complex Communications Networks, 1998, pp. 175-190.

(Continued)

*Primary Examiner* — Amritbir K Sandhu
(74) *Attorney, Agent, or Firm* — Lando & Anastasi, LLP

(57) ABSTRACT

A free-space optical signal receiver includes a plurality of detectors whose individual outputs are delayed to correct for variations in arrival time caused by aberration in the medium through which the optical signal propagates, and combined to provide a single output. Each of the plurality of detectors sense the free-space modulated optical signal and provide a detector signal representative of the modulation of the optical signal. Each detector signal is delayed by a delay value to generate a delayed signal, and each delay value is selected to correct for variation in arrival time of the optical signal at each of the detectors, resulting in the delayed signals being substantially time-aligned. The delayed signals are constructively combined into a combined signal representative of the modulation aspect, and the combined signal is provided as an output.

20 Claims, 7 Drawing Sheets

(56) References Cited

U.S. PATENT DOCUMENTS

| | | | | |
|---|---|---|---|---|
| 6,493,873 | B1* | 12/2002 | Williams | H04H 20/63 375/E7.002 |
| 7,646,834 | B2* | 1/2010 | Friedman | H04B 7/18513 375/347 |
| 8,295,712 | B2 | 10/2012 | Chen et al. | |
| 8,411,351 | B2 | 4/2013 | McCallion et al. | |
| 9,110,154 | B1* | 8/2015 | Bates | G01S 7/497 |
| 9,240,843 | B1* | 1/2016 | Malouin | H04B 10/616 |
| 2002/0196497 | A1* | 12/2002 | LoCascio | B82Y 5/00 398/98 |
| 2006/0013591 | A1 | 1/2006 | Rohde | |
| 2007/0031150 | A1 | 2/2007 | Fisher et al. | |
| 2008/0226300 | A1* | 9/2008 | Mayer | H04B 10/677 398/158 |
| 2008/0240736 | A1 | 10/2008 | Ji et al. | |
| 2008/0266573 | A1 | 10/2008 | Choi et al. | |
| 2011/0097085 | A1* | 4/2011 | Oda | H04B 10/2569 398/65 |
| 2011/0170881 | A1* | 7/2011 | Nakashima | H04B 10/697 398/209 |
| 2012/0121271 | A1* | 5/2012 | Wood | H04B 10/1121 398/118 |
| 2013/0272337 | A1 | 10/2013 | Tan et al. | |
| 2014/0314406 | A1 | 10/2014 | Zerbe et al. | |
| 2015/0171957 | A1* | 6/2015 | Featherston | H04B 10/674 398/38 |
| 2015/0319061 | A1 | 11/2015 | Kowalevicz | |
| 2016/0013870 | A1 | 1/2016 | Sorin et al. | |
| 2018/0034550 | A1* | 2/2018 | Rakich | G02F 1/11 |
| 2018/0054259 | A1 | 2/2018 | Kowalevicz et al. | |
| 2018/0091227 | A1 | 3/2018 | Dolgin et al. | |
| 2018/0091228 | A1* | 3/2018 | Kowalevicz | G02B 5/28 |
| 2018/0091230 | A1* | 3/2018 | Dolgin | H04B 10/671 |
| 2018/0091232 | A1 | 3/2018 | Dolgin et al. | |
| 2018/0102853 | A1 | 4/2018 | Dolgin et al. | |
| 2018/0145764 | A1 | 5/2018 | Dolgin et al. | |
| 2018/0145765 | A1 | 5/2018 | Kowalevicz et al. | |
| 2018/0167145 | A1 | 6/2018 | Dolgin et al. | |
| 2018/0234231 | A1 | 8/2018 | Dolgin et al. | |
| 2018/0372517 | A1* | 12/2018 | Yao | G01D 5/34792 |

OTHER PUBLICATIONS

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul. 2012, pp. 1-60.

Juarez et al., "High-sensitivity DPSK receiver for high-bandwidth free-space optical communication links", Optics Express, vol. 19, May 2011, pp. 1-8.

Zhang, L. et al. "Microring-based Modulation and Demodulation of DPSK Signal" Optical Society of America, Optics Express, vol. 15, No. 18, Sep. 3, 2007.

International Search Report and Written Opinion for application No. PCT/US2017/053667 dated Dec. 15, 2017.

Fang et al., "Multi-channel Silicon Photonic Receiver Based on Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

* cited by examiner

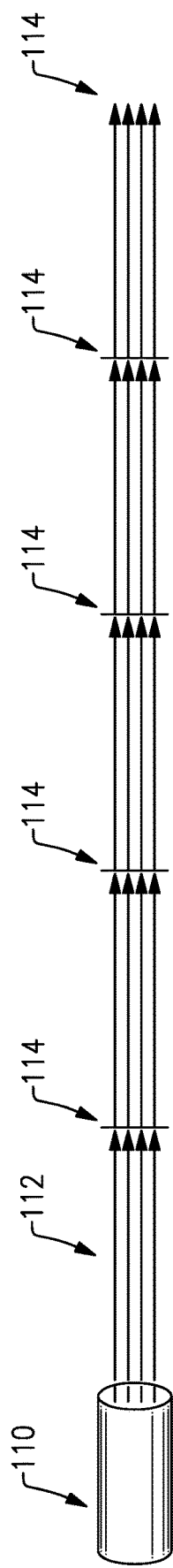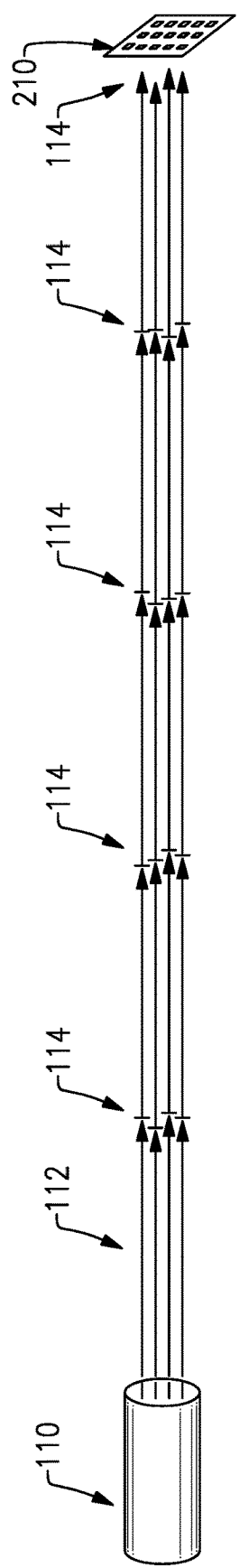

SYSTEMS AND METHODS FOR DETECTION AND DEMODULATION OF OPTICAL COMMUNICATION SIGNALS

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, such as the amplitude, phase transitions, and the like, from which the underlying signal and the information may be recovered.

A receiver for line-of-sight communications using modulated light waves, such as a modulated laser beam, should collect signal from a large enough area that the acquired signal power is high enough for accurate detection. Conventionally a telescope may be aimed at the source laser and the cross sectional area of the telescope, or aperture, may determine how much signal power is collected and concentrated (e.g., focused) at a receiver. Some modulation schemes, such as phase modulation, for example, require coherent light, hence a laser is often the light source. When such light is collected and focused, the best reception occurs if all the light rays (across the cross-section of the telescope) arrive at the detector in unison as a single wavefront, maintaining alignment of the original phase relationships of the light rays. If some of the light rays have propagated through different media along the way, or were skewed, delayed, aberrated, or the like, as is typical for light waves traveling some distance through the atmosphere, wavefront correction may be required in conventional light-focusing systems. Such systems may use adaptive optics to attempt to correct the light rays to their original phase relationships and minimize the negative effect of aberration. In many cases, it may be impossible for conventional receivers to accurately demodulate aberrated light without wavefront correction.

SUMMARY OF THE INVENTION

Aspects and embodiments are directed to optical signal receivers formed from an array of detection elements, i.e., detectors, in combination with adaptive delays that combine the signals from the detectors such that constructive and destructive interference across the individual detectors results in effective wavefront correction. Additional benefits of a delay-combined array is that it may achieve selective directionality with adjustment of the adaptive delays to achieve soft steerability, not requiring mechanical alignment or re-positioning, and may operate without optics or lens systems to direct the light, and may operate with direct reception of the light in free space, e.g., without waveguides or focusing. Optical signal receivers in accord with aspects and embodiments disclosed herein may compensate for aberrations in the received light by operation of the detection elements, by adjusting delays applied to one or more of the detection elements, or a combination of these.

In at least one embodiment, directionality toward a light source and compensation for aberration are achieved by adjusting the delays until a "guide" or reference signal, i.e., an a priori known signal, is detected among the intended communications signal. In one example, the optical signal receiver continuously adjusts the delays to track the reference signal and therefore the intended light source, maintaining directional steering toward the source and compensation for variations in the wavefront through aberration, such as air perturbations.

Additionally, signals from the detection elements of the array may be simultaneously combined with different sets of delays, or variously delayed and combined in software, allowing two or more light signals simultaneously received from two or more directions to be received using the same array. Further, the signals from each of the detection elements of the array may be recorded and later combined with varying delays, allowing future recovery of any of multiple light signals after the fact.

According to one aspect, an optical signal receiver is provided. The optical signal receiver includes a plurality of detectors, each of the plurality of detectors configured to sense a free-space modulated optical signal and to provide a detector signal representative of a modulation aspect of the optical signal; a plurality of delays, each of the plurality of delays coupled to a respective one of the plurality of detectors and configured to operate upon the corresponding detector signal to delay the detector signal by a delay value to generate a delayed signal, the delay values being selected to correct for variation in arrival time of the optical signal at each of the plurality of detectors caused at least by aberration in a medium through which the optical signal propagates, the plurality of delayed signals being substantially time-aligned; a combiner configured to constructively combine the plurality of delayed signals into a combined signal, the combined signal being representative of the modulation aspect; and an output to provide the combined signal.

In some examples, the optical signal receiver includes a controller configured to control the delay value of one or more of the plurality of delays. The controller may be configured to establish the delay value of one or more of the plurality of delays based at least in part upon a direction from which the optical signal is expected. The controller may be configured to adapt the delay value of one or more of the plurality of delays based upon detecting a guide signal.

In some examples, the modulation aspect is a phase modulation and each of the plurality of detectors includes an optical resonator that converts the phase modulation into an amplitude modulation to provide the detector signal, the detector signal thereby having amplitude variations representative of the phase modulation.

In some examples each of the plurality of detectors is one of a micro-ring resonator and a Fabry-Perot etalon.

Some examples may include a storage medium for recording one or more of the detector signals. Further, each of the plurality of delays configured to operate upon at least one of the detector signals may be configured to retrieve the recorded detector signals from the storage medium and operate upon the recorded detector signals.

Some examples include a telescope system configured to concentrate the optical signal near the plurality of detectors.

According to another aspect, a receiver array is provided. The receiver array includes a plurality of optical resonators, each of the plurality of optical resonators configured to provide a detector signal having amplitude variations representative of a phase modulation of a received optical signal, the plurality of detector signals being at least partially mis-aligned in time due to variations in arrival times of the received optical signal at each of the plurality of optical resonators; a plurality of delays configured to compensate for time mis-alignment of the plurality of detector signals, each of the plurality of delays configured to operate upon at least one of the detector signals to delay the detector signal by a delay value to generate a delayed signal, the delay values being selected such that the plurality of delayed signals are substantially time-aligned; a combiner configured to constructively combine the time-aligned plurality of delayed signals into a combined signal, the combined signal being representative of the phase modulation; and an output to provide the combined signal.

Some examples include a controller configured to control the delay value of one or more of the plurality of delays. The controller may establish the delay value of one or more of the plurality of delays based upon a direction from which the optical signal is expected. The controller may adapt the delay value of one or more of the plurality of delays based upon detecting a guide signal.

In some examples each of the plurality of optical resonators is one of a micro-ring resonator and a Fabry-Perot etalon.

The receiver array may include a storage medium for recording one or more of the detector signals. Further, each of the plurality of delays configured to operate upon at least one of the detector signals may be configured to retrieve the recorded detector signals from the storage medium and operate upon the recorded detector signals.

Some examples include a telescope system configured to concentrate the optical signal near the plurality of optical resonators.

According to another aspect, a method of receiving an optical signal is provided. The method includes receiving, at a plurality of receivers, a modulated optical signal from free-space; converting each of the modulated optical signal received at the plurality of receivers into a receiver signal representative of a modulation aspect of the modulated optical signal; compensating for variation in arrival time of the modulated optical signal at each of the plurality of receivers by delaying each of the plurality of receiver signals by a delay value to generate a delayed signal, the variation in arrival time caused at least in part by variations of the medium through which the modulated optical signal travels, and the delay values selected to substantially time-align the plurality of delayed signals; combining the plurality of delayed signals to generate a combined signal, the combined signal being representative of the modulation aspect; and providing the combined signal to a demodulator.

The method may include adjusting the delay value based upon a direction from which the optical signal is expected. The method may include monitoring the combined signal for a guide signal and adjusting the delay value based upon the guide signal.

In some examples, the modulation aspect may be a phase modulation and the signal representative of the modulation aspect may include an amplitude representative of the phase modulation.

In some examples the method may include recording the plurality of receiver signals in a storage medium. Delaying each of the plurality of receiver signals may include retrieving each of the plurality of receiver signals from the storage medium.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 2A-2B are schematic diagrams of examples of light ray propagation;

DETAILED DESCRIPTION

Figure 1:
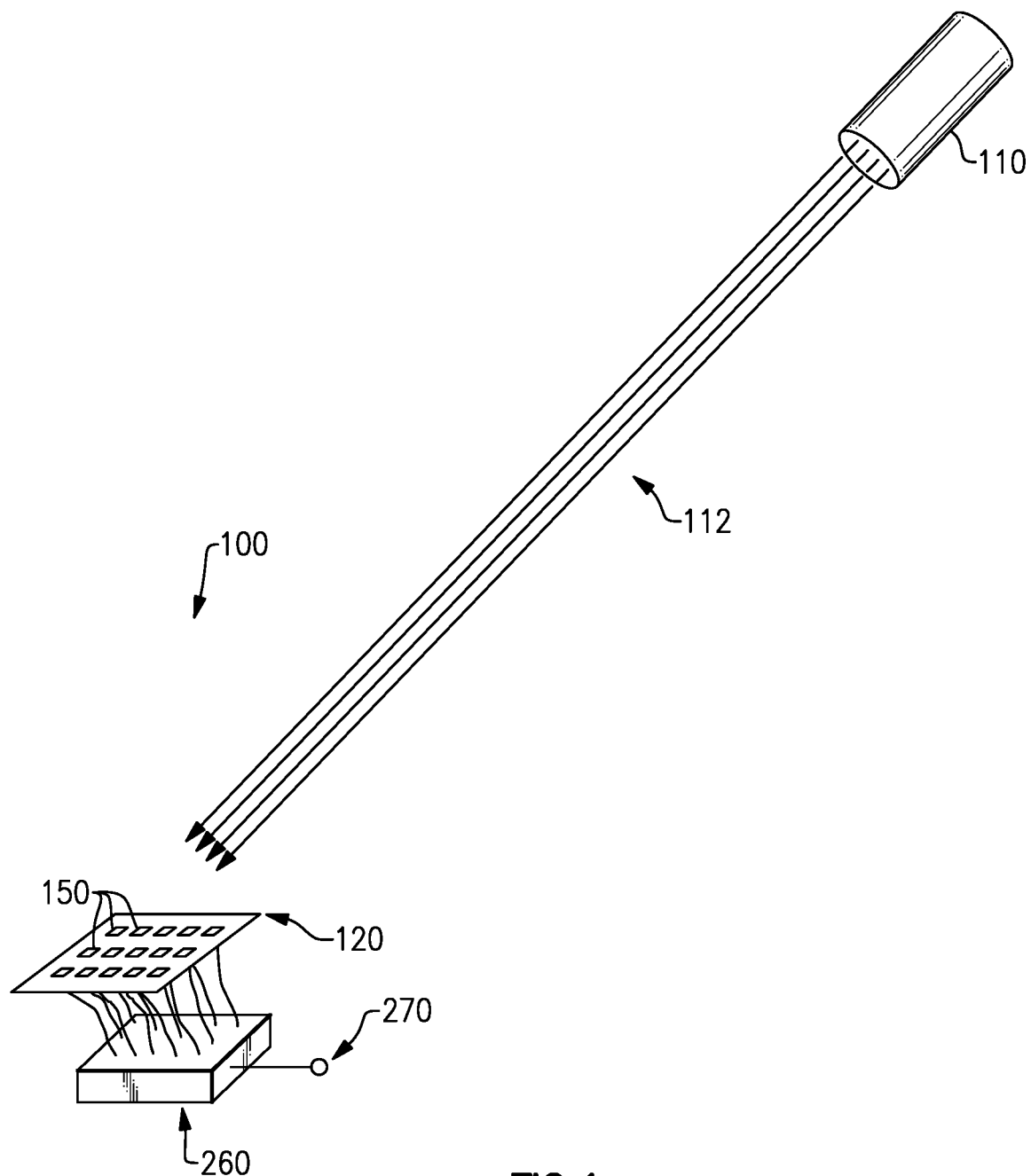
FIG. 1 is a schematic diagram of an example of an optical signal receiver.

Aspects and embodiments are directed to arrays of detection elements as receivers for line-of-sight optical communications. The use of an array may allow light collection across an area of nondescript shape and size, and the number and placement of the detection elements may improve the signal-to-noise ratio in the received optical signal.

As discussed above, it may be desirable to maintain (or recover) coherency of the received optical signal, or to compensate for lack of coherency, particularly in applications where the optical signal may include phase modulation. Atmospheric perturbations tend to erode and ultimately destroy the coherency of an optical signal. Conventional approaches of adaptive optics to compensate for wavefront variation caused by air perturbations have several disadvantages, including large size and weight. Further, precise alignment of all elements of an adaptive optics system and precise control of the adaptive optics is generally required for acceptable operation, but can be difficult to achieve. Adaptive optics perform wavefront correction directly on the light rays and physically correct variations on the order of fractions of a wavelength.

Aspects and embodiments disclosed herein provide an alternative approach in which optical signal receivers are formed as an array of detection elements whose outputs are variously delayed and combined. Wavefront variation is compensated for by operation of the detection elements, by varying delays to each element, or by a combination of these techniques. Compensation for wavefront variation in accord with aspects and embodiments disclosed herein is simpler than conventional wavefront correction and may be effective on a physical scale associated with a modulation rate, which may be many tens, hundreds, or thousands of wavelengths, and is therefore achievable with less precision, cost, and complexity than conventional wavefront correction, e.g., adaptive optics.

Additionally, an array with varying delays forms a phased array that may be electrically steered toward various directions, including being directed toward a light source carrying modulated information. Similarly, a direction to a light source may be found using the phased array by adjusting the delays until the desired light source is received.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric medium, e.g., air. The terms light, light signal, and optical signal are not meant to imply any particular characteristic of the light, such as frequency or wavelength, band, coherency, spectral density, quality factor, etc. unless it is expressly stated or contextually clear that such a characteristic is intended.

Referring to FIG. 1 there is illustrated an example of an optical signal receiver 100 according to certain embodiments. The optical signal receiver 100 includes an array 120 comprising multiple detection elements 150 and a delay processor 260. The delay processor 260 applies individual delays to the signals generated by each of the detection elements 150 and may apply additional processing. By applying individual delays to the output of each detection element 150, the array 120 as a whole can be made to effectively correct for wavefront variation and can be made selective to light coming from a certain direction. For example, by applying individual delays as discussed in more detail below, light from undesired directions is dispersed, or skewed, by the time delays while light signals from a desired direction are caused to reinforce each other by the individual delays. Additional variation or adjustment of the delays can account for wavefront variation, e.g., wavefront arrival time, caused by air perturbations acting on light rays received across the multiple detection elements 150. Delays may be applied by optical, electrical, software, or other means. For example, optical signals from the detection elements 150 may be directly delayed by optics. Alternatively, optical signals may be converted to electrical signals, by the detection elements 150 themselves or by additional components, and the delays may be applied electrically. Additionally, signals may be processed by various systems, or recorded in a medium, such as a memory, and delays may be applied by a processing system, such as by software, in real time or at a later time.

In certain examples the detection elements 150 may be converters of various types. For example, the detection elements 150 may be or may include photodetectors to produce an electrical output signal indicative of the intensity of light. In further examples, each detection element 150 may be an optical converter that converts an optical light signal into a variation of itself, i.e., an optical output signal. In certain examples, each detection element 150 may be a modulation converter, for example converting a phase modulated optical signal into an intensity modulated optical signal. Examples of detection elements 150 include optical resonators such as Fabry-Perot etalons, micro-ring resonators, micro-electro-mechanical systems (MEMS), and the like. In certain examples, an optical resonator receives phase modulated light and each transition in phase of the received light causes a variation in intensity of output light from the resonator. Accordingly, phase variations in the received light may cause intensity variations in the output light. In certain examples, each detection element 150 is an optical resonator functioning to convert a phase modulation into an amplitude or intensity modulation, coupled with a photodetector to convert the intensity variations into an electrical signal. In other examples, each detection element 150 may be a modulation converter of a different type, to convert a modulated property of the light into a different modulated property of the light, and may include a photodetector to convert the re-modulated light into an electrical signal. In certain examples, each detection element 150 may be a complete receiver in its own right, e.g., each detection element 150 may be a combination of an element that responds to variations in physical properties of light, such as phase, wavelength, intensity, and the like, and additional processing circuitry that performs more complex analysis of the detector's response to the light. Additionally, in certain examples each detection element 150 may be made up of multiple detection elements configured to act together to provide a signal to the delay processor 260.

It will be appreciated by those of skill in the art, with the benefit of this disclosure, that the phased array approach to wavefront correction and receiver steering disclosed herein may be beneficially applied to varying light modulation schemes, which may require differing detection elements 150 or other processing, or both, to yield signals upon which the application of delays as described herein will be effective. Further, various types of optical modulation are distinct from, and generally do not create any limitation on, a modulation of an underlying signal, e.g., a baseband or radio frequency signal modulated in frequency, amplitude, phase, or any combination thereof, that may be the source signal for modulating a light source with any type of optical modulation.

FIG. 2A illustrates the propagation of coherent light under ideal conditions, without experiencing aberrations due to an atmospheric condition, imperfection, or contamination in the medium through which the light travels, for example. Shown is a light source 110, such as a laser, for example, that generates a coherent light signal 112. For the purposes of the disclosure herein, coherency may be understood as phase alignment of a bundle of light rays. At a particular point in space and time, if all the light rays have the same phase then the light is coherent. If the light signal 112 does not experience any aberrations, such as imperfections, contaminants, or perturbations in the propagation medium, the light signal 112 will have wavefronts 114 that remain phase aligned, i.e., coherent, as the light signal 112 propagates, e.g., from left to right in FIG. 2A.

FIG. 2B illustrates the propagation of coherent light through a more realistic medium, such as air, for example, where the light may encounter aberrations such as, notably, air perturbations. In FIG. 2B the light rays are influenced by air perturbations, or other obstructive influences, that may affect a portion of the light signal 112 differently than adjacent portions of the light signal 112 and, accordingly, the wavefronts 114 of the light signal 112 may become misaligned as illustrated in FIG. 2B. If information being carried by the light signal 112 is contained in the phase of the light signal 112, a conventional optical receiver that focuses and concentrates the rays of the light signal 112, e.g., an optic lens system, will result in focused light that is not coherent and no longer carries the phase information. Such a conventional optical receiver requires some form of wavefront correction to restore the phase relationship across the wavefronts 114. By contrast, with an array 120 of detection elements 150, each detection element 150 receives a portion of the light signal 112 that may be coherent within that portion. Accordingly, variations in arrival times of the wavefronts at the various detection elements 150 may be compensated for with delay processing by, for example, the delay processor 260. Additionally, in certain examples, variation in arrival time may be compensated for by the delay processor 260 on a scale of the modulation rate of the light signal 112 rather than on the scale of the wavelength, as discussed in more detail below.

It is to be understood that labeling of wavefronts, e.g., wavefronts 114 in FIGS. 2A and 2B, is arbitrary. Any position in space and/or time of a light signal may be identified as a wavefront for the purpose of discussing phase alignment with respect to other space-time positions. Further, the phase relationship, or coherency, of a bundle of light rays at one position in space-time may change as the bundle of light rays propagates and is influenced by the medium through which it travels. Further, alterations in phase relationship experienced by a particular bundle of light rays may not be the same as that experienced by another bundle of light rays that come before or after. Accordingly, the alignment or mis-alignment of arriving wavefronts may change significantly from one moment to the next, as illustrated by the varying alignment shown for each wavefront 114 in FIG. 2B.

It is to be understood that optical signals modulated to carry information have one or more characteristics that are changed by a transmitter in either a continuous or discrete fashion, or some combination of the two, and segments of the light over time may be associated with the particular characteristic(s) that indicate the information being conveyed. For example, a phase modulated digital optical transmitter may emit coherent light of a certain phase relationship (relative to a reference time and/or phase) to indicate a particular value. The light emitted to indicate the value may be considered a segment of light, or a length of light, whose phase indicates the value. At later times the transmitter will alter the light characteristic to emit a second segment of light to indicate a second value, then again later to emit a third segment of light, then a fourth segment, and so on. The rate at which the transmitter discretely alters the characteristic, as in this example, is a modulation rate of the transmitter, also known as a symbol rate or baud rate. Each segment of light has a physical length associated with it based upon the duration and the speed of light in the propagation medium. For example, a modulation rate of $10^8$ baud (100 million transitions per second) emits light segments of 10 nanosecond duration with length of approximately 3 meters. Higher modulation rates generate shorter light segments and lower modulation rates generate longer light segments. It is to be understood that a single light segment may have one of multiple phase values and therefore the indicated value may be a multi-bit binary value. Accordingly, baud rate or modulation rate is not necessarily equal to a transmission bit rate for a transmission system.

Some optical transmission systems may alter different or additional light characteristics, such as amplitude, frequency, wavelength, for instance, and may vary the modulation rate over time, e.g., based on channel characteristics, noise, error rate, and the like. Additionally, some optical transmission systems may modulate light in an analog fashion, such as by a continuous variation in amplitude of the light signal, and therefore not have a modulation rate per se. For the purposes of this disclosure, aspects and embodiments are generally described in the context of a discrete transmission system including a phase modulation, though it is to be understood that aspects and embodiments disclosed herein may be equally useful as receivers for transmission systems that generate light signals that convey information differently than that described.

As discussed above, certain embodiments of an optical receiver system in accord with aspects disclosed herein may compensate for variation in arrival time on a scale of a modulation rate rather than on the scale of a wavelength. For example, with continued reference to FIG. 2B, a wavefront 114 may have lost coherency during propagation such that portions of the wavefront may have phase differences on the order of multiple wavelengths relative to other portions of the wavefront. Accordingly, a conventional optical signal receiver using optics to focus the light signal 112 may apply wavefront correction to shift portions of the light signal by a fraction of a wavelength or multiple wavelengths, requiring accuracy of a fraction of a wavelength, which may be complex and costly. In certain embodiments of an array-based optical receiver as disclosed herein, each of the detection elements 150 may receive only a portion of the light signal 112 and the portion received may be sufficiently coherent, e.g., not having significant phase variation across the portion, that the detection element 150 may accurately detect the phase content of the portion of the light signal 112 without the need for wavefront correction in the optical domain Additionally, a phase characteristic of the portion of the light signal 112 may be constant for the duration of the light segment, i.e., between modulation transitions, thus delays applied to the outputs of each detection element 150 may sufficiently correct for variations using a granularity on the order of the segment time (or length) instead of requiring dimensional accuracy on the order of a wavelength of the light. For example, a rate of 100 million transitions per second generates light segments of 3 meters length each, as discussed above, and the accuracy of corrections (e.g., by applying time delays) only need be a fraction of the segment length, thus optical receiver systems in accord with aspects disclosed herein may require correction accuracy on the order of, for example, 3 cm, rather than a fraction of a wavelength, which may be on the order of microns. Various embodiments may operate at even higher transmission rates, such as 1,000 million transitions per second, i.e., 1 trillion transitions per second (1 Giga-baud), or more.

The operation of delays applied to individual detection elements 150 arranged in an array will now be described with reference to FIG. 3, which shows a one dimensional linear array 310 of detection elements 150. Each of the detection elements 150 has an associated delay 260 acting upon its respective output signal(s). The delayed signals are further processed by a processor 262, which combines the delayed signals, e.g., by adding them together, to produce a combined signal at the output 270. In certain embodiments, combining signals may include weighted addition of signals or may include other forms of combining or mixing.

For light sources far enough away from the array 310, and assuming no atmospheric perturbations, the light beams arriving at the array 310 are parallel to each other and arrive as a planar wavefront. If the light beams come from a direction normal to an axis "a" of the linear array 310, such as the light signal 320 in FIG. 3, the wavefront of the light signal 320 arrives at all the detection elements 150 at the same time. In such a case, the delays 260 do not need to delay the signals from any of the detection elements 150, or the delays 260 may delay each of the signals equally, to no net effect, and the processor 262 adds together the signals from the detection elements 150 effectively without any delays applied. Wavefronts of light coming from other directions, such as the light signal 330, arrive at the array 310 at an angle so that the wavefront arrives at the detection element 150a before the wavefront arrives at the detection element 150k at the other end of the array 310. The remaining detection elements 150 receive the wavefront of the light signal 330 at various times in between. No two detection elements 150 receive the wavefront of the light signal 330 at the same time. Accordingly, combination of the output signals from the detection elements 150 due to the light signal 330 without any delays (or with equal delays) may result in a signal at the output 270 having only a small signal component associated with the light signal 330, as compared to a larger signal component associated with the light signal 320. In this manner, a linear array 310 of light detection elements 150 whose outputs are combined without delays yields selective directivity in a direction normal to the axis "a" of the linear array 310. The amount of directivity may primarily depend upon the number and spacing of array elements, i.e., the detection elements 150.

Certain embodiments may incorporate various additional aspects or components to further provide selectivity of one light signal over another. For example, light of certain wavelengths may be preferred or rejected through the use of frequency selective filters, frequency selective coatings, and/or by incorporating frequency selective features in the detection elements 150, such as exhibited by Fabry-Perot etalons, micro-ring resonators, or other resonant structures.

Figure 3:
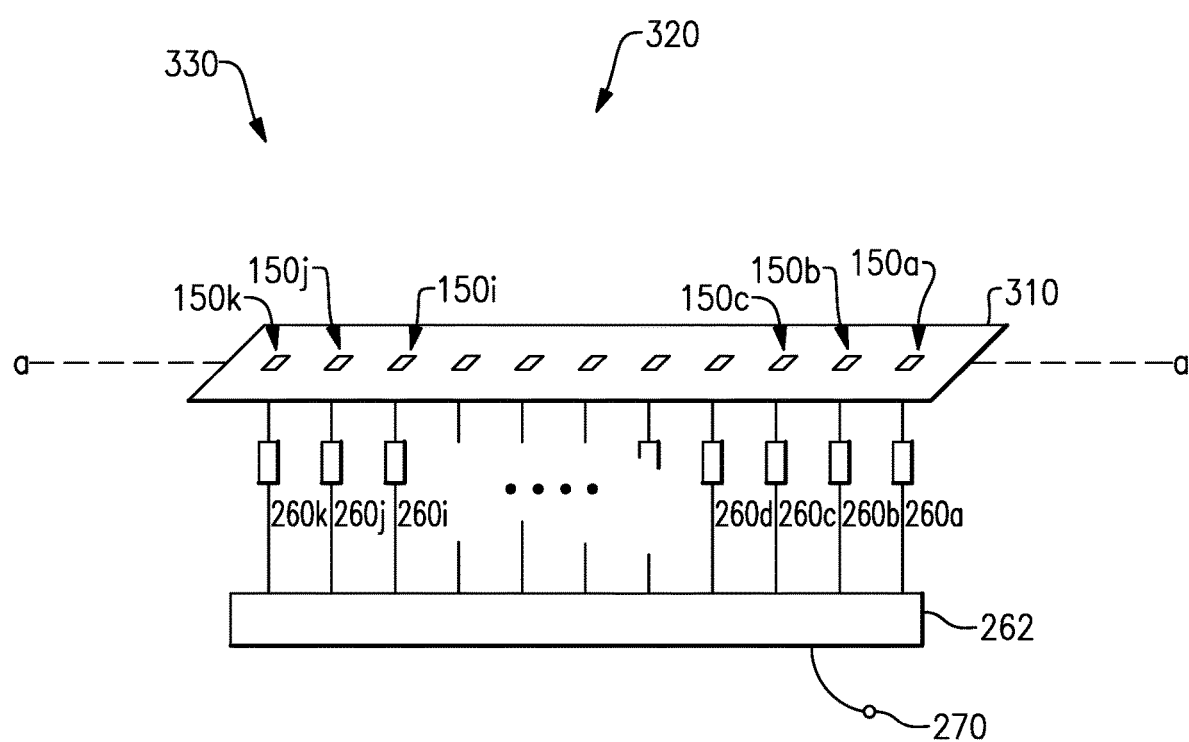
FIG. 3 is a schematic diagram of another example of an optical signal receiver.

With continued reference to FIG. 3, if the desired light source is instead the light signal 330 arriving at an oblique angle, the output signals from each of the detection elements 150 may be individually delayed such that the directivity of the array 310 is shifted toward the angle from which the light signal 330 is coming. Unlike the light signal 320, the wavefront from the light signal 330 does not arrive at all the detection elements 150 at the same instant in time. However, delays applied to the output signals from each of the detection elements 150 can "correct" for the time shifts in the arrival of the light signal 330 at the various detection elements 150. With a linear array such as that of the array 310, wherein the detection elements 150 are substantially equally spaced apart and arranged substantially in a single line, the wavefront from the light signal 330 arrives at each of the detection elements 150 in series with substantially equal time delays between each of the adjacent detection elements 150. For example, if the detection elements 150 of array 310 are spaced apart by a few centimeters, a wavefront may arrive at one of the detection elements 150 earlier than it arrives at the next adjacent one of the detection elements 150 by about 0.1 nanoseconds (ns). Between the two extreme ends of a linear array having eleven elements, as shown in FIG. 3 for example, a wavefront could arrive at the near end of the array 310 one nanosecond earlier than it arrives at the far end of the array 310. In a specific example, the wavefront from the light signal 330 arrives at the near end detection element 150k first, then arrives at the next detection element 150j approximately 0.1 ns later, and the next detection element 150i after another 0.1 ns, and so on, until the wavefront finally arrives at the far end detection element 150a approximately 1.0 ns after having reached the near end detection element 150k. If each of the delays 260 is set to apply progressive delays with 0.1 ns increments, the resulting combination of the delayed signals in the processor 262 is similar to the wavefront having reached each of the detection elements 150 at the same time, effectively directing the linear array 310 toward the light signal 330.

Further, delay values that selectively direct the array 310 toward the light signal 330 cause the now undesired light signal 320 to have its wavefront dispersed or skewed by the delays 260 when the delayed output signals are combined in the processor 262. Similar to the light signal 330 in the case above with no delays, the wavefront from the light signal 320 is now a minor component of the combined signal, as the wavefront from the light signal 320 does not impact all the inputs to the processor 262 (i.e., the delayed outputs from the delays 260) at the same time. Instead, the impact of the wavefront from the light signal 320 is spread out in time relative to the processor 262 inputs; although the wavefront from the light signal 320 arrives at each of the detection elements 150 simultaneously, its presence in the signal output from the delay 260k occurs well after its presence in the signal output from the delay 260a, for instance. In this manner, delay values applied by the delays 260 may be selected such that light from the direction of the light signal 330 is preferred over light from the direction of the light signal 320. Accordingly, the delays may be chosen or established to selectively modify the directivity of the linear array 310.

In certain examples, the array 310 is a linear array and is therefore only directional in one dimension. That is, all light signals above, below, or to the side of the array 310 that are normal to the axis "a" equally influence the output 270 when no delays are applied. When delays are applied, all light sources at a particular angle off the axis "a" equally impact the output 270. In three-dimensional free space, a particular angle to the axis includes an infinite range of directions. To be directionally selective in more than one dimension, a two dimensional array, such as the array 120 shown in FIG. 1, or the array 410 shown in FIG. 4, may be used instead of the linear array 310.

Figure 4:
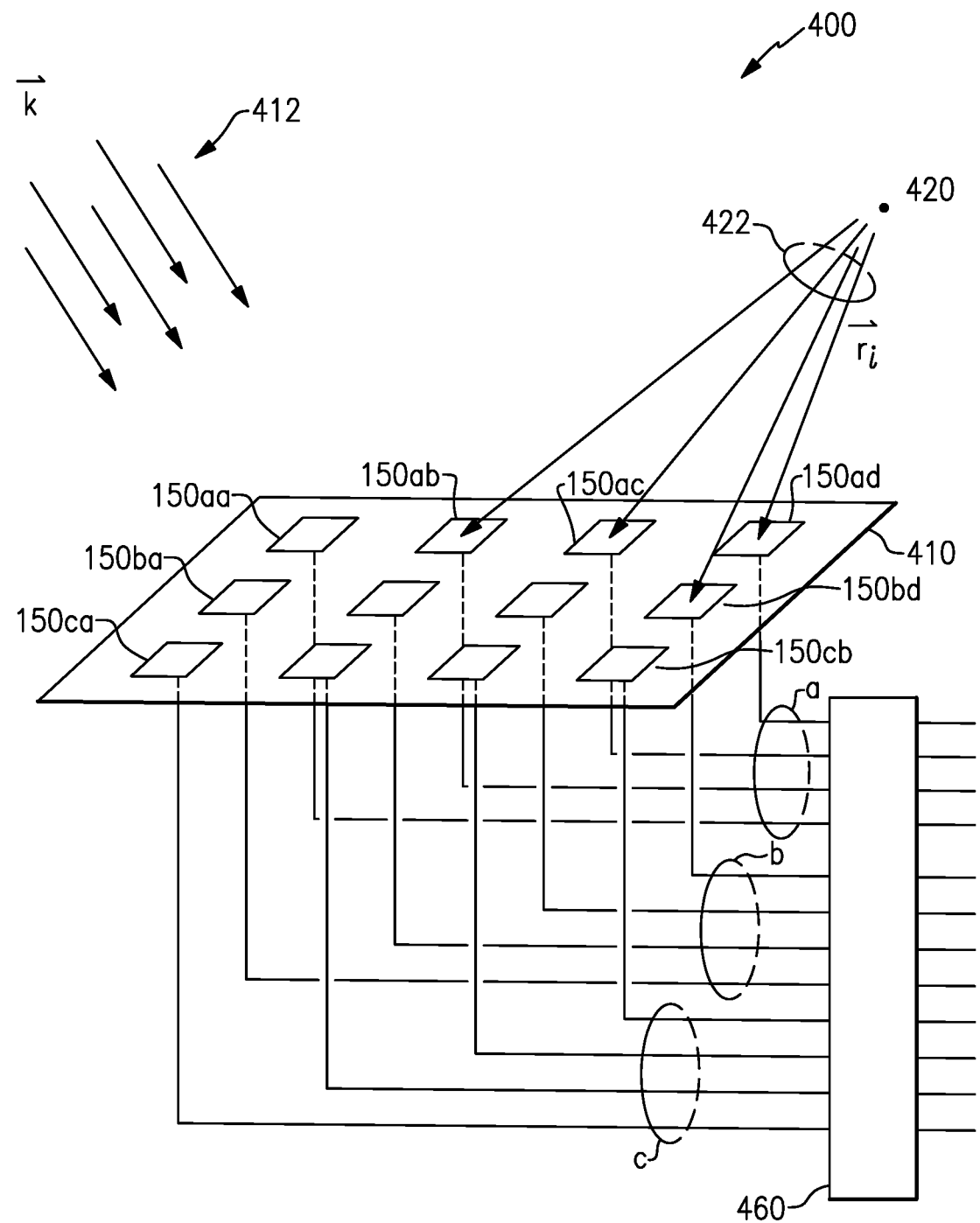
FIG. 4 is a schematic diagram of another example of an optical signal receiver.

FIG. 4 shows an optical signal receiver 400 with a two-dimensional array 410 in accord with aspects and embodiments disclosed herein. A more generalized discussion of selecting delays is presented with reference to FIG. 4. The two-dimensional array 410 includes three rows of four detection elements 150 each. A two-dimensional array, such as the two-dimensional array 410, may include any number of detection elements 150. While the array 410 has twelve (12) detection elements 150 as a 3×4 array, other embodiments may include any number of detection elements 150 in varying arrangements. Certain embodiments include elements that are not arranged on a plane, or include elements that are not equally spaced from each other, or both. An arriving light signal 412 is shown and is represented by a wave vector $\vec{k}$. In certain examples, the light signal 412 may be of a form, when it was transmitted (e.g., before any aberration by air perturbation), as described by expression (1):

$$S(t) \cdot e^{j\omega t} \qquad (1)$$

where $e^{j\omega t}$ represents the optical carrier (light) with angular velocity $\omega$ or freq $f=\omega/2\pi$, and $S(t)$ is the amplitude of the light. In an assumed example of amplitude modulated light, $S(t)$ is the signal to be recovered by the optical signal receiver 400.

Because the wavefront of the light signal 412 is not parallel with the array 410, the signal arriving at each of the detection elements may be considered to be shifted in time from expression (1) above. One method of expressing the signal from expression (1) above as it arrives at each of the detection elements 150 is by defining a set of reference vectors 422 $\vec{r}_i$ that point from a reference point 420 to each of the detection elements, for example $\vec{r}_{ab}$ points from the reference point 420 to the detection element 150ab. Applying the vector representation $\vec{k}$ for the arriving light signal 412, and the vector positions $\vec{r}_i$ of the detection elements 150, time-shifted individual signals arriving at each detection element $\mathbf{150}_i$ may be represented by expression (2):

$$S\left(t - \frac{\vec{k} \cdot \vec{r}_i}{\omega}\right) \cdot e^{j(\omega t - \vec{k} \cdot \vec{r}_i)} \qquad (2)$$

Expression (2) shows that the time "shift" at each detection element $\mathbf{150}_i$ is $(\vec{k} \cdot \vec{r}_i/\omega)$. Accordingly, applying a delay 460 of $(\vec{k} \cdot \vec{r}_i/\omega)$ to the output of each detection element $\mathbf{150}_i$ generates output signals from the delays 460 that are the same as if the wavefront of the light signal 412 arrived at each of the detection elements 150 at the same time with no delay applied. The delay values effectively correct the detection element 150 outputs to compensate for the wavefront arriving at an oblique angle. Using this wavefront correction the array 410 may be selectively directed toward light signals 412 coming from the direction of the wave vector $\vec{k}$. Specifically, the array 410 of detection elements $\mathbf{150}_i$ is selectively directed in the direction of $\vec{k}$ by applying a delay 460 to the output of each detection element $\mathbf{150}_i$ of $(\vec{k} \cdot \vec{r}_i/\omega)$, where the reference vectors $\vec{r}_i$ represent the relative positions of each of the detection elements $\mathbf{150}_i$.

In the simplified example of amplitude modulated light, the detection elements 150 may each be photodetectors whose outputs may indicate the intensity or amplitude of the light they receive. It should be understood by those of skill in the art that in this simplified example the detection elements 150 effectively remove the optical carrier $e^{j\omega t}$ from the light signal 412. Accordingly, it will be apparent to those of skill in the art with the benefit of this disclosure that the combination of delayed outputs from the detection elements capitalizes on constructive addition of the underlying signal $S(t)$ as opposed to wave interference from the optical carrier. Accordingly, the detection elements 150 may be far apart from each other relative to the wavelength of the light signal 412, and the wavefront correction being applied may be on the order of the spacing of the detection elements 150 and not the wavelength of the light signal 412. Signals arriving from the desired direction, e.g., the light signal 412, have wavefront arrivals corrected by the applied delay values while unwanted signals from other directions have their arrival times dispersed (i.e., skewed or smeared) by the delay values.

The expressions described above and the delay applied to the output of each detection element 150 by the delays 460 are not dependent upon the array 410 being planar as shown in FIG. 4. Accordingly, in various embodiments, an array 410 may be generically shaped and may conform to the shape of another object. For example, an array of photodetectors may be mounted on an irregular shape, such as the body of a vehicle or aircraft, and the delays applied to the output of each detection element 150 may be applied according to the discussion above, i.e., delay values chosen for a specified direction (wave vector $\vec{k}$) and relative detection element positions specified by vectors $\vec{r}_i$. The relative positions of the detection elements 150 need not conform to any particular geometry. For example, the detection elements 150 need not be linear, planar, nor equally spaced from each other. Delays applied to the outputs of the detection elements 150 can account for any irregularity in shape and can achieve wavefront correction for light signals arriving from any direction as though the wavefront arrived at each detection element 150 at the same time. In other embodiments, the detection elements 150 may be individually placed at various positions on various surfaces or with varying support structures.

Figure 5:
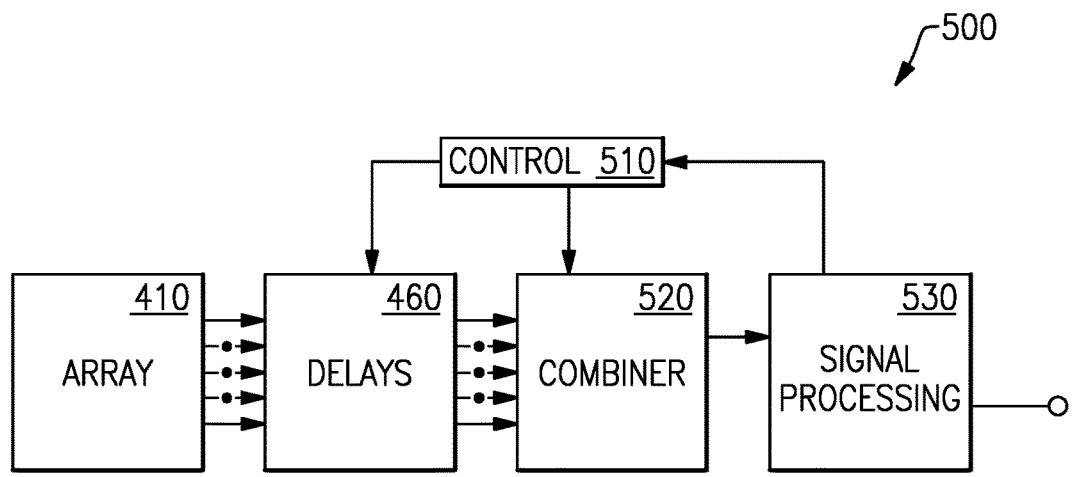
FIG. 5 is a block diagram of an example of an optical signal receiver system.

The delay values may be adapted to changing conditions, such as relative motion between the light source 110 and the receiving array 410 (e.g., a moving source or movement of the array due to, e.g., being on a moving vehicle). Accordingly, delay values applied by the delays 460 may be continuously modified to account for relative motion. With reference to FIG. 5, an example of an array processing system 500 is shown and includes delays 460 that receive output signals from the detection elements 150 of an array 410. The delays 460 are controlled by a controller 510 that can adjust the delay for any of the detection elements 150, and the controller 510 may also control a combiner 520 that combines the delayed output signals from the delays 460. The output from the combiner 520 is provided to and may be further processed by a signal processor 530.

In certain embodiments, the controller 510 establishes the delay values within the delays 460 by being programmed with the relative positions of each of the detection elements 150 and being programmed with a particular direction from which the desired light signal is expected to arrive, according to the delay values previously discussed with respect to the wave vector and positional reference vectors. Alternately, the light source may be moving and the controller 510 may be programmed with information about the expected motion of the light source and thereby adjust the delays over time to selectively direct the array 410 to provide wavefront correction for the direction to the light source as it moves. Additionally, the array 410 may be incorporated with a vehicle or aircraft that may be moving, and the controller 510 may be provided with information about the movement of the vehicle or aircraft, e.g., by various sensors or tracking elements, and again the controller 510 may adjust the delays over time to selectively direct the array 410 to provide wavefront correction for the direction to the light source as the vehicle or aircraft moves. Accordingly, the controller 510 may adjust the delays over time to selectively direct the array 410 to accommodate for movement of both the light source and the array 410.

In other embodiments, the controller 510 establishes the delay values in a trial-and-error process to determine the best set of delays to achieve an acceptable level of wavefront correction, e.g., to achieve reception of the signal S(t). For example, the controller 510 may receive feedback from the combiner 520, the signal processor 530, or a combination of these and other sources, to identify whether any particular change in the delays causes improvement or deterioration in the reception of the signal S(t), and adjust the delays accordingly. Such a trial-and-error process may begin from an expected set of delay values or may start from an arbitrary set of delay values. In some embodiments, the controller 510 may determine an acceptable set of delay values without knowledge of the geometry of the detection elements 150 or the direction of the desired signal.

In certain embodiments, the controller 510 may establish delay values by seeking a particular guide signal. For example, the controller 510 may be programmed with a priori knowledge of a particular guide signal that should be received along with the desired light signal, and the controller 510 may be programmed to search for the guide signal by adjusting delay values until the guide signal is present in a received signal, such as from the output of the combiner 520 or the output of the signal processor 530. As above, such may begin from an expected set of delay values or may start from an arbitrary set of delay values. A set of delay values that result in reception of the guide signal are therefore a proper set of delay values to receive the desired light signal. For example, the guide signal may be a known signal transmitted on a nearby wavelength from a transmitter co-located with the desired light signal 412, or the guide signal may be a known signal multiplexed with the underlying signal S(t) (such as by time division, code division, or other orthogonal methods) and accordingly modulated upon the desired light signal 412. In other embodiments the guide signal may take other forms.

In any of the above embodiments, the controller 510 may be further programmed to monitor a received signal, such as from the output of the combiner 520 or the output of the signal processor 530, and adjust the delay values applied by the delays 460 to correct for shifts in the arriving desired light signal 412, such as by movement or vibration of the light source 110 or the array 410 or by aberrations in the desired light signal 412 caused by, e.g., atmospheric turbulence. Movement, vibration, and air perturbations cause small changes in the wavefront arrival times of the desired light signal 412 at each of the detection elements 150. The above described adaptive delay techniques may be beneficially applied to correct for such variations. In at least one such embodiment, the controller 510 may monitor the received signal for the presence of the guide signal and adjust the delay values applied by the delays 460 to compensate.

Figure 6:
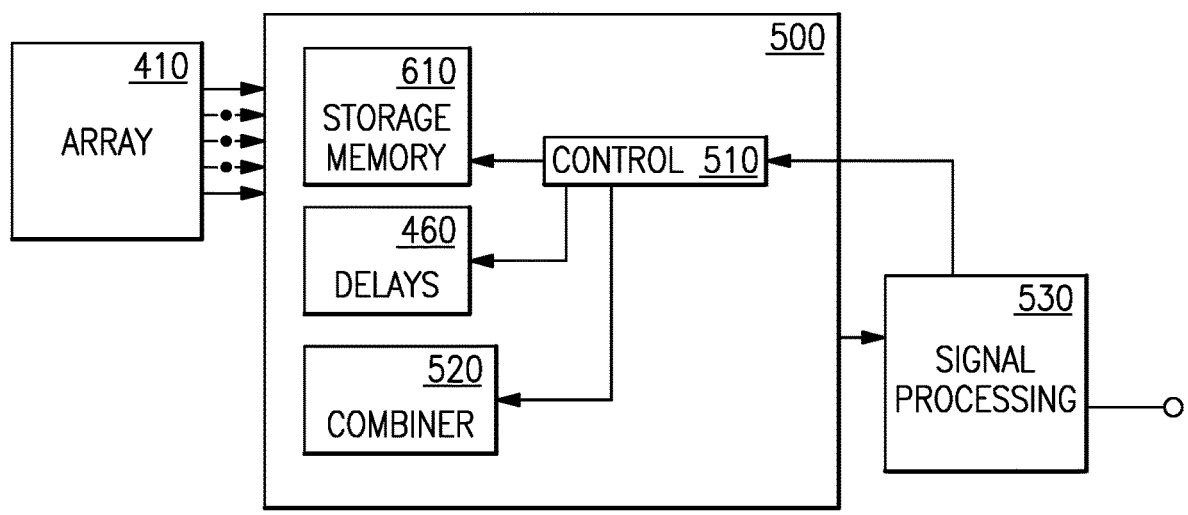
FIG. 6 is a block diagram of another example of an optical signal receiver system.

The systems and methods discussed above do not need to operate in real time upon received signals. For example, where the controller 510 is described as adapting delay values to search for a guide signal, or monitoring a received signal and adapting the delay values to maintain positive reception, such activities of the controller 510 need not be done in real time. The output signals from each of the detection elements 150 may be recorded in a storage medium and the process of combining the signals with various delay values may be done off-line or otherwise not in real time. As illustrated in FIG. 6, the array processor 500 may further include a storage medium 610 that can retain one or more of the raw (un-delayed and un-combined) output signals from each of the detection elements 150. Various combinations of delay values applied to the stored output signals may be later processed to recover the details of one or more previously received light signals just as if it were being received at the time of processing.

Whether the delays and combining of output signals occur in real time or in post-processing, each output signal from each of the detection elements 150 may be delayed by more than one delay value and each delayed output signal may be combined with differing delayed output signals from other of the detection elements 150 to selectively direct the array 410 to multiple light signals at the same time. For example, and with reference to FIG. 4, in addition to the light signal 412 arriving from one direction there may be a second desired light signal arriving from a second direction simultaneously. The outputs from the detection elements 150 may be processed by a first delay and combine operation that applies a first set of delay values and combines this first set of delayed output values to produce a first output signal representative of the first light signal 412. Simultaneous with the operation of the first delay values there may be a second delay and combine operation that applies a second set of delay values to the outputs of the detection elements 150 and combines this second set of delayed output values with each other to produce a second output signal representative of the second light signal. Applying two sets of delay values to the outputs of each detection element and separately combining the two sets achieves a simultaneous directing of the array 410 in two directions, one toward the light signal 412 and the other toward the second light signal (not shown). The same may be applied in like manner with a third set of delay values or a fourth set of delay values, or any number of sets of delay values, to accommodate changing applications and operational requirements. In this manner, the array 410 may be selectively directed to numerous directions at one time. In embodiments, the first and second delay and combine operations as well as additional delay and combine operations may be implemented as a single delay and combine element with sufficient processing logic to handle a varying number of sets of delay values to cause the array 410 to be selectively directed toward a varying number of light signals simultaneously. In embodiments, processing to receive light signals from multiple directions may also be done off-line, in post-processing, by recording the output signals from one or more of the detection elements 150 in a storage medium for later processing as previously discussed.

Various embodiments of the optical signal receivers described above include constructive reinforcement of desired optical signals by correcting for variation in timing of reception of the optical signals at various detection elements. The variation in timing of reception is due to a combination of the relative positions of the detection elements to each other and to the optical wavefront and/or variations in the shape of the wavefront due to, e.g., aberration in the medium through which the wavefront travels. Unlike conventional optical systems that focus light from a particular direction and use adaptive optics to correct for aberration, the optical signal receivers described herein may be aimed electronically with selective directionality created by the chosen delay values, and do not require any moving mechanical parts such as folding mirrors, gimbals, or adaptive lens techniques. As a result, the optical signal receivers described herein are more tolerant of vibration and motion and require less precision in physical placement of elements than conventional optical systems.

Figure 7:
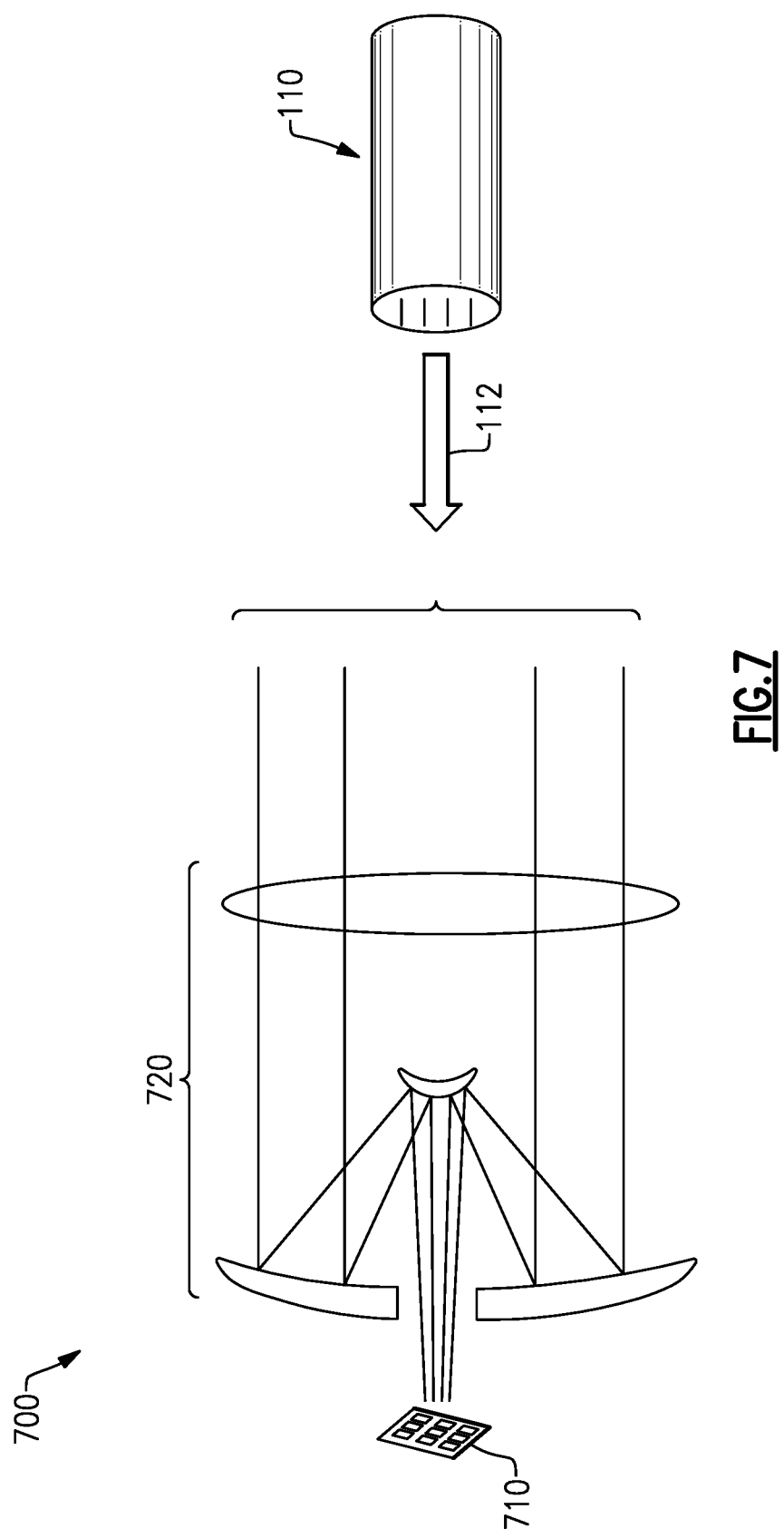
FIG. 7 is a schematic diagram of another example of an optical signal receiver.

In various embodiments, any of the optical signal receivers described herein may be combined with elements of traditional optics systems. For example, an array according to any embodiment as previously described may be placed near the focal point of an optical lens assembly, such as a telescope, and the delay values applied to the array elements may beneficially correct for aberration in the light signal received. With reference to FIG. 7, an example optical signal receiver 700 is shown including a detection element array 710 and a telescope system 720. The telescope system 720 may include various lenses, reflectors, etc. that gather an arriving light signal 112 from a transmitting light source 110. Because the array 710 includes multiple detection elements, the array 710 is not placed at the focal point of the telescope system 720 because doing so may focus all of the arriving light onto only one of the detection elements. Instead the array 710 may be placed near the focal point of the telescope system 720 such that each of the detection elements in the array 710 may be exposed to a portion of the light signal 112 that entered a different part of the telescope aperture and traveled a different path through the telescope system 720.

In certain embodiments, the telescope system 720 may provide all or the majority of the selective directionality of the optical signal receiver 700 because light signals coming from other directions either may not enter the aperture of the telescope system 720 or may not enter at a correct angle to be a significant part of the nearly-focused light at the location of the array 710. Accordingly, the telescope system 720 may be positioned such that its axis points to the light source 110. Additionally, the telescope system 720 may be designed to have equal optical path lengths from all points of its aperture to the corresponding point at the array 710. If the telescope system 720 provides such equal optical path lengths for all beams of the light signal 112, and if the array 710 is a planar array aligned normal to the axis of the telescope system 720, wavefronts of the light signal 112 arrive at all elements of the array 710 at substantially the same time. However, variations due to aberrations in the light signal 112, e.g., by atmospheric turbulence prior to the light signal 112 entering the telescope system 720, may result in differing arrival times at the detection elements of the array 710. Accordingly, delay values applied to outputs from the detection elements of the array 710 may be used to compensate for aberration effects as previously described. Accordingly, the optical signal receiver 700 may accommodate and compensate for aberration without the use of adaptive optics or other conventional corrective techniques.

Any of the processing previously described, such as recording signals, applying one or more delays to any signal, combining signals, demodulating signals, and control functions may be implemented in various forms of logic, whether in hardware or in software, or any combination thereof. Signals may be processed in analog form or may be converted to a digital form via an Analog-to-Digital Converter (ADC) and processed in digital form.

As discussed above with regard to FIG. 5, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices (e.g., smart phones, tablet computers, laptop computers, and personal digital assistants) and network equipment (e.g., load balancers, routers, and switches). Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular hardware, architecture, network, or communication protocol.

Figure 8:
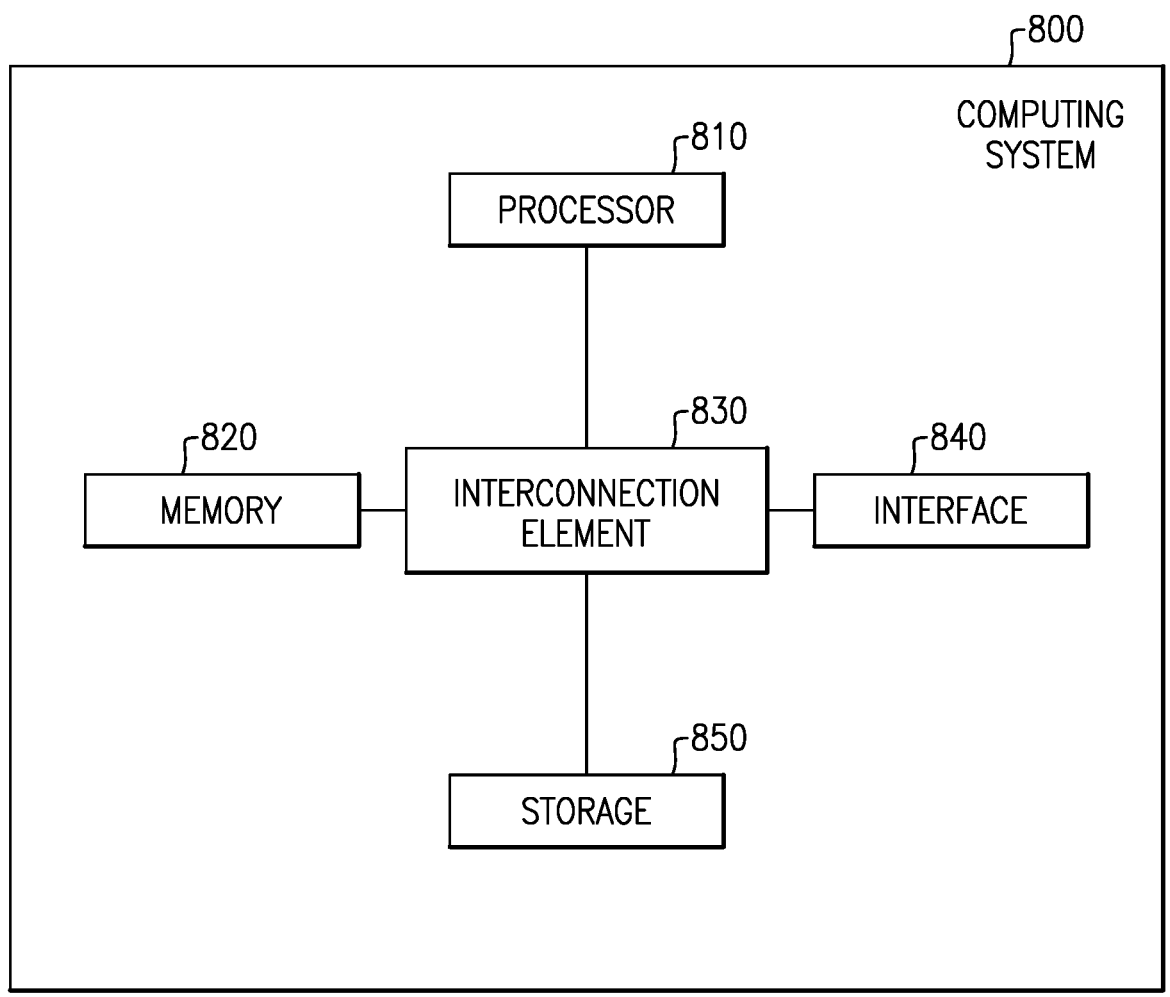
FIG. 8 is a block diagram of an example of a computing device that may be used to implement one or more components of an optical signal receiver system.

Referring to FIG. 8, there is illustrated a block diagram of a computing system 800, in which various aspects and functions may be practiced. As illustrated in FIG. 8, at least one computing system 800 includes a processor 810, a memory 820, an interconnection element 830, an interface 840 and a data storage element 850. To implement at least some of the aspects, functions, and processes disclosed herein, the processor 810 performs a series of instructions that result in manipulated data. The processor 810 may be any type of processor, multiprocessor, controller, field programmable gate array (FPGA), application specific integrated circuit (ASIC), or digital signal processor (DSP). The processor 810 is connected to other system components, including one or more memory 820 devices, by the interconnection element 830.

The memory 820 may store one or more programs (e.g., sequences of instructions coded to be executable by the processor 810) and/or data, which may include recorded output signals form the detection elements 150, during operation of the computing system 800. Thus, the memory 820 may be a relatively high performance, volatile, random access memory 820 such as a dynamic random access memory 820 ("DRAM") or static memory 820 ("SRAM"). However, the memory 820 may include any device for storing data, such as a disk drive or other nonvolatile storage device.

Components of the computing system 800 are coupled by an interconnection element 830. The interconnection element 830 may include any communication coupling between system components such as one or more physical busses in conformance with specialized or standard computing bus technologies or interfaces, and may include differing technologies to couple to different components. The interconnection element 830 enables communications, including instructions and data, to be exchanged between system components of the computing system 800.

The computing system 800 also includes one or more interface 840 devices such as input devices, output devices and combination input/output devices. Interface 840 devices may receive input or provide output. More particularly, output devices may render information for external presentation. Input devices may accept information from external sources. Examples of interface 840 devices include keyboards, mouse devices, trackballs, microphones, touch screens, printing devices, display screens, speakers, network interface cards, storage devices, etc. Interface 840 devices allow the computing system 800 to exchange information and to communicate with external entities, such as users and other systems.

The data storage element 850 includes a computer readable and writeable nonvolatile, or non-transitory, data storage medium in which instructions may be stored that define a program, or other object, that is executed by the processor 810. The data storage element 850 also may include information that is recorded, on or in, the medium, such as recorded output signals form the detection elements 150, and processed by the processor 810 during execution of one or more programs. More specifically, the information may be stored in one or more data structures specifically configured to conserve storage space or increase data exchange performance. The instructions may be persistently stored as encoded signals, and instructions may cause the processor 810 to perform any of the functions described herein. The medium may, for example, be optical disk, magnetic disk or flash memory 820, among others. In operation, the processor 810 or some other controller causes data to be read from the storage element 850 into another memory, such as the memory 820, that allows for faster access to the information by the processor 810 than does the storage medium included in the data storage element 850. A variety of components may manage data movement between the storage element 850 and other memory elements and examples are not limited to particular data management components. Further, examples are not limited to a particular memory system or data storage system.

Although the computing system 800 is shown by way of example as one type of computing system 800 upon which various aspects and functions may be practiced, aspects and functions are not limited to being implemented on the computing system 800 as shown in FIG. 8. Various aspects and functions may be practiced on one or more computers having different architectures or components than that shown in FIG. 8. For instance, the computing system 800 may include specially programmed, special-purpose hardware, such as an application-specific integrated circuit ("ASIC") tailored to perform a particular operation disclosed herein. Another example may perform the same operation using a grid of several computing devices running operating systems with various processors and/or several specialized computing devices running proprietary hardware and operating systems.

The computing system 800 may be a computing system 800 including an operating system that manages at least a portion of the hardware elements included in the computing system 800. In some examples, a processor or controller, such as the processor 810, executes an operating system. In other examples the processor 810 may include other forms of logic, such as an ASIC, FPGA, or DSP, and may have other forms of instruction sets, and may or may not execute an operating system.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical signal receiver comprising:
a plurality of detectors, each of the plurality of detectors configured to receive a free-space modulated optical signal and to output a detector signal representative of a modulation aspect of the optical signal;
a plurality of delays, each of the plurality of delays coupled to a respective one of the plurality of detectors and configured to operate upon a corresponding detector signal output from the respective one of the plurality of detectors to delay the detector signal by a delay value to generate a delayed signal, delay values being selected to correct for variation in arrival time of the optical signal at each of the plurality of detectors caused at least by aberration in a free-space medium through which the optical signal propagates, a resulting plurality of delayed signals being substantially time-aligned;
a combiner configured to constructively combine the plurality of delayed signals into a combined signal, the combined signal being representative of the modulation aspect; and
an output to provide the combined signal.

2. The optical signal receiver of claim 1 further comprising a controller configured to control the delay value of one or more of the plurality of delays.

3. The optical signal receiver of claim 2 wherein the controller is further configured to establish the delay value of the one or more of the plurality of delays based at least in part upon a direction from which the optical signal is expected.

4. The optical signal receiver of claim 2 wherein the controller is further configured to adapt the delay value of the one or more of the plurality of delays based upon detecting a guide signal.

5. The optical signal receiver of claim 1 wherein the modulation aspect is a phase modulation and each of the plurality of detectors includes an optical resonator that converts the phase modulation into an amplitude modulation to provide the detector signal, the detector signal thereby having amplitude variations representative of the phase modulation.

6. The optical signal receiver of claim 1 further comprising a storage medium for recording one or more of the detector signals.

7. The optical signal receiver of claim 6 wherein each of the plurality of delays configured to operate upon the corresponding detector signal includes being configured to retrieve recorded detector signals from the storage medium and operate upon the recorded detector signals.

8. The optical signal receiver of claim 1 further comprising a telescope system configured to concentrate the optical signal near the plurality of detectors.

9. A receiver array comprising:
a plurality of optical resonators, each of the plurality of optical resonators configured to output a detector signal having amplitude variations representative of a phase modulation of a received optical signal, the plurality of detector signals being at least partially mis-aligned in time due to variations in arrival times of the received optical signal at each of the plurality of optical resonators;
a plurality of delays configured to compensate for time mis-alignment of the plurality of detector signals, the plurality of delays configured to operate upon the plurality of detector signals to delay the plurality of detector signals by respective delay values to generate a corresponding plurality of delayed signals, the delay values being selected such that the plurality of delayed signals are substantially time-aligned;
a combiner configured to constructively combine the time-aligned plurality of delayed signals into a combined signal, the combined signal being representative of the phase modulation; and
an output to provide the combined signal.

10. The receiver array of claim 9 further comprising a controller configured to control the delay value of one or more of the plurality of delays.

11. The receiver array of claim 10 wherein the controller is further configured to establish the delay value of the one or more of the plurality of delays based upon a direction from which the optical signal is expected.

12. The receiver array of claim 10 wherein the controller is further configured to adapt the delay value of the one or more of the plurality of delays based upon detecting a guide signal.

13. The receiver array of claim 9 wherein each of the plurality of optical resonators is one of a micro-ring resonator and a Fabry-Perot etalon.

14. The receiver array of claim 9 further comprising a storage medium for recording one or more of the detector output signals.

15. The receiver array of claim 9 further comprising a telescope system configured to concentrate the received optical signal near the plurality of optical resonators.

16. A method of receiving an optical signal comprising:
receiving, at a plurality of receivers, a modulated optical signal from free-space;
converting the modulated optical signal received at the plurality of receivers into a plurality of receiver output signals, each receiver output signal being representative of a modulation aspect of the modulated optical signal;
compensating for variation in arrival time of the modulated optical signal at each of the plurality of receivers by delaying each of the plurality of receiver output signals by a respective delay value of a plurality of delay values to generate a corresponding plurality of delayed signals, the variation in arrival time caused at least in part by variations of a free-space medium through which the modulated optical signal travels, and the plurality of delay values selected to substantially time-align the plurality of delayed signals;
combining the plurality of delayed signals to generate a combined signal, the combined signal being representative of the modulation aspect; and
providing the combined signal to a demodulator.

17. The method of claim 16 further comprising adjusting the plurality of delay values based upon a direction from which the modulated optical signal is expected.

18. The method of claim 16 further comprising monitoring the combined signal for a guide signal and adjusting the plurality of delay values based upon the guide signal.

19. The method of claim 16 wherein converting the modulated optical signal received at the plurality of receivers into the plurality of receiver output signal representative of the modulation aspect includes generating each receiver output signal with an amplitude representative of a phase modulation of the modulated optical signal.

20. The method of claim 16 further comprising recording the plurality of receiver output signals in a storage medium and wherein delaying each of the plurality of receiver signals includes retrieving each of the plurality of receiver output signals from the storage medium.

* * * * *

UNITED STATES PATENT AND TRADEMARK OFFICE
CERTIFICATE OF CORRECTION

PATENT NO. : 10,530,494 B2
APPLICATION NO. : 15/433326
DATED : January 7, 2020
INVENTOR(S) : Benjamin P. Dolgin et al.

Page 1 of 1

It is certified that error appears in the above-identified patent and that said Letters Patent is hereby corrected as shown below:

In the Claims

Column 20, Line 40, delete "signal" and insert -- signals --.

Signed and Sealed this
Twenty-fifth Day of February, 2020

Andrei Iancu
*Director of the United States Patent and Trademark Office*